United States Patent Office 3,003,211
Patented Oct. 10, 1961

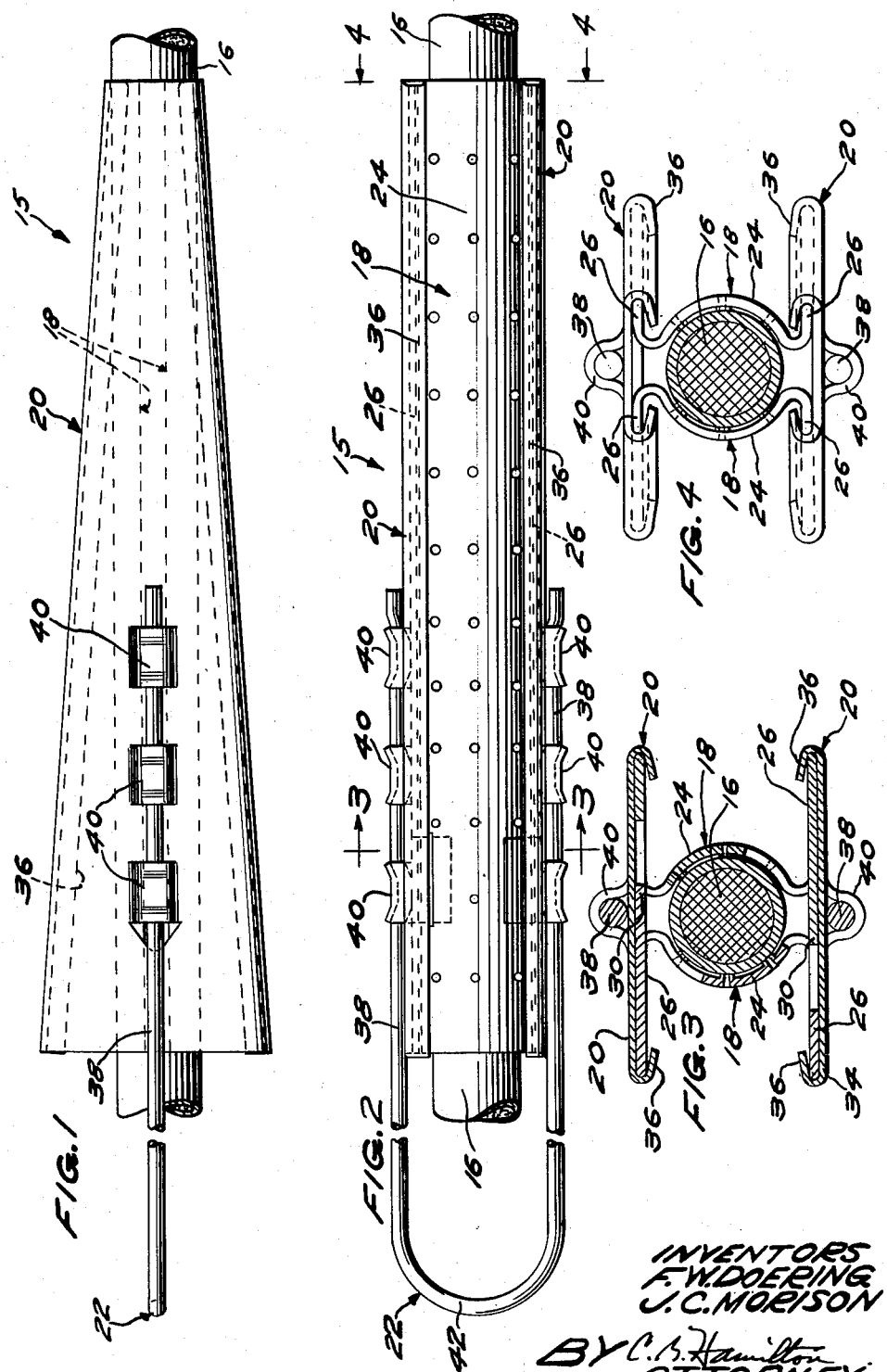

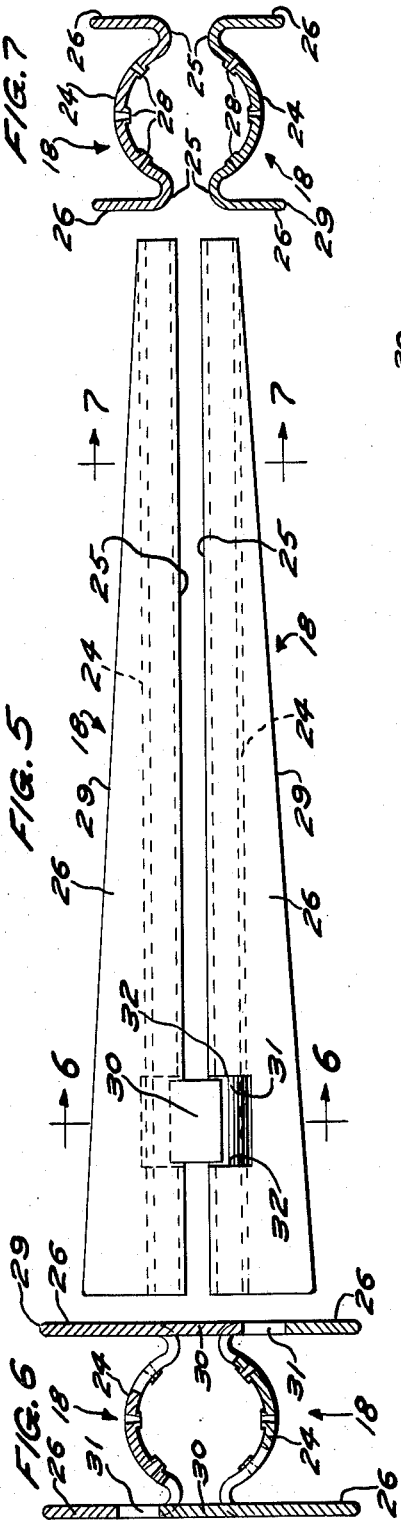

3,003,211
DEVICE FOR SUPPORTING CABLES AND THE LIKE
Fred William Doering, Cicero, and James Currie Morison, La Grange, Ill., assignors to Western Electric Company, Incorporated, New York, N.Y., a corporation of New York
Filed Jan. 9, 1958, Ser. No. 707,917
1 Claim. (Cl. 24—126)

This invention relates to cable-supporting devices and more particularly to devices applicable to cables or multiple wires for suspending them from telephone poles or other structures.

An object of the present invention is to provide an improved device for supporting a cable or multiple wires from poles or other structures.

Another object of the invention is the provision of an improved composite cable-supporting device, the components of which are readily assembled to securely clamp and suspend a cable from a suitable support.

With these and other objects in view, the invention contemplates the provision of a pair of sheet-metal cable-gripping members, each having a concave cylindrical portion engageable with opposite sides of a cable and having a pair of parallel flanges disposed on opposite sides of the cable in coplanar alignment with the flanges of the other gripping member and with the outer edges of the aligned flanges of the gripping members disposed in diverging relation to each other. The gripping members are urged toward each other into gripping engagement with the cable by a pair of wedge-shaped clamping plates which are connected to the ends of a U-shaped hanger and have return bent edge portions disposed in diverging relation to each other for receiving the flanges of the gripping members. The arrangement of the components assembled onto a cable is such that when the hanger is suspended from a telephone pole or other structure, the gripping members are urged by the cable toward the narrow end of the wedge-shaped clamping plates and are stressed by the clamping plates toward each other into tight gripping engagement with the cable.

A more complete understanding of the invention will be had by reference to the following detailed description thereof and the accompanying drawings, in which FIGS. 1 and 2 are plan and side elevational views, respectively, of the cable-supporting device applied to a cable and embodying the present invention;

FIG. 3 is an enlarged cross sectional view of the wire-clamping device taken on the line 3—3 of FIG. 2;

FIG. 4 is an enlarged cross sectional view taken on the line 4—4 of FIG. 2 and showing the cable-supporting device in elevation;

FIG. 5 is a plan view of the cable-gripping members in side by side relation to each other;

FIGS. 6 and 7 are enlarged cross sectional views of the gripping members taken on lines 6—6 and 7—7, respectively, of FIG. 5;

FIG. 8 is a face view of one of the clamping-members of the device with a portion of a hanger attached thereto;

FIG. 9 is an end view of the clamping member shown in FIG. 8;

FIG. 10 is a fragmentary longitudinal sectional view through the clamping member taken on line 10—10 of FIG. 8; and showing a portion of the hanger secured thereto;

FIGS. 11 and 12 are enlarged fragmentary sectional views through the clamping member taken on the lines 11—11 and 12—12, respectively, of FIG. 10; and FIG. 13 is a longitudinal sectional view through the clamping member similar to FIG. 10 but showing the clamping member and a portion of the hanger before they have been deformed into interlocking relation to each other.

Referring to the drawings, the present device 15 is used for securely clamping a portion of a cable or multiple wires 16 used in the communication field or the like and for suspending the cable or wires from a telephone pole, building, or other support. As seen in FIGS. 1–4, the device comprises a pair of gripping members 18 engageable with opposite sides of the cable, and a pair of clamping members or plates 20 secured to the ends of a U-shaped hanger 22 for urging the gripping members 18 into clamping engagement with the cable, the hanger 22 being suspendable from a pole or other support for supporting the clamping plates 20 and the gripping members 18 in assembled relation about a cable and for urging the gripping members 18 into gripping engagement with the cable 16.

The gripping members 18 are made from sheet metal and are identical in shape. Each member has a cylindrical portion 24 with outwardly curved parallel edge portions 25 from which extend a pair of reversely bent flanges 26 in parallel relation to each other. In cross section, the cylindrical portions 24 of the gripping members are less than a half circle and are engageable with opposite sides of a cable 16 to grip the cable therebetween.

The concave inner surfaces of the cylindrical portions 24 may be roughened to provide for good frictional engagement between the gripping members 18 and the cable. This roughened surface may be produced by piercing the cylindrical portion 24 at a plurality of places to form inwardly directed projections 28 (FIG. 7).

As seen in FIG. 5, the flanges 26 on the gripping members 18 are wedge shaped and have outer edges 29 disposed in oblique relation to the inner edges 25. With the gripping members 18 applied to opposite sides of a cabl, the flanges 26 are in coplanar alignment with one another and the oblique outer edges 29 of the aligned pairs of flanges are disposed in diverging relation to each other.

A lug or key 30 (FIGS. 5 and 6) is punched from the cylindrical portion 24 of each of the gripping members and extends laterally from and parallel to a flange 26 into a notch 31 in the flange 26 of the other gripping member for engagement with the shoulders 32 thereon to prevent longitudinal displacement of the gripping members relative to each other.

The clamping plates 20, which are made from sheet metal and are identical to each other, each have a flat body 34 conforming in outline to that of the cooperating flanges 26 of the gripping members 18 assembled on the cable. Along their diverging side edges, the clamping elements 20 have return bent flanges 36 which cooperate with the body 34 to form a pair of diverging grooves or tracks for receiving the flanges 26. The diverging flanges 26 and 36 form cooperable camming and interlocking elements on the gripping members and the clamping members capable of interlocking the gripping members and the clamping members in assembled relation about the cable and of camming the gripping members toward each other into gripping engagement with the cable in response to movement of the gripping members toward the narrow or converging ends of the clamping members.

Each of the clamping members 20 is fixedly secured to the end portions 38 of the hanger 22. In the embodiment disclosed herein, the hanger is a round wire or rod bent into U-shape with the straight end portions 38 thereof threaded through a plurality of connector loops 40 punch formed from the body portion 34 adjacent the wide end thereof and in spaced relation to each other along the longitudinal centerline thereof. After the end portions 38 of the hanger have been threaded through the connector loops 40 of the clamping members and properly positioned relative thereto, portions of the wire 38 and the loops 40 are deformed as shown in FIG. 10 to interconnect the hanger and the clamping members with the hanger extending from the divergent or wide end of the clamping members.

When the device 15 is to be used to support a portion of a cable 16, the gripping members 20 are placed in opposed relation to each other in engagement with opposite sides of the cable with the flanges 26 in coplanar alignment and interlocked relation with one another. The cable adjacent the wide portion of the flanges 26 of the gripping members 18 is bent laterally to facilitate the assembly of the clamping and hanger components 20 and 22 to the gripping components 18. The clamping plates 20 are placed over and in engagement with the pairs of aligned flanges 26 of the gripping members 18, and the hanger 22 is pulled to move the clamping plates 20 relative to the gripping members and bring the cam elements 36 of the clamping plates into engagement with the cam elements 26 of the gripping members and cause the gripping members to be moved toward each other to tightly grip the cable therebetween. The looped portion 42 of the hanger 22 may then be hooked over a fastener on a telephone pole or other support and be suspended therefrom. Any pull applied to the cable such as the weight of the cable, serves to stress the gripping members and move them toward the narrow end of the clamping plates 20 which serves to move the gripping members closer together and thus increase the pressure of the gripping members on the cable.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

A cable clamping and supporting device comprising a pair of sheet metal gripping members having cylindrical portions engageable with opposite sides of a cable, each of said gripping members having a pair of reversely bent flanges disposed on opposite sides of the cylindrical portion in parallel relation to each other and to a plane midway therebetween and provided with parallel outer edges sloping in the same direction toward one end of the member, the flanges of each of the gripping members being disposed in coplanar alignment with and in laterally spaced relation to the flanges of the other gripping member and with the outer edges of the aligned flanges of the gripping members disposed in diverging relation to each other, a pair of wedge-shaped sheet metal clamping members having returned bent edge portions disposed in diverging relation to each other and forming grooves for receiving the outer edges of the flanges of the gripping members therein to support the gripping members and to urge them into gripping engagement with the cable, each of said gripping members having a notch formed in one of the flanges and a lug formed from the cylindrical portion thereof and extending laterally from the other flange and in the plane thereof into the notch of the other gripping member to interlock the gripping members against longitudinal displacement relative to each other, and a U-shaped hanger having opposite ends thereof secured to the diverging end portions of the clamping members for supporting the device with the gripping members in clamping engagement with the cable.

References Cited in the file of this patent

UNITED STATES PATENTS

| 347,150 | Beebe | Aug. 10, 1886 |
| 624,770 | Eibee | May 9, 1899 |
| 2,403,839 | Adolph | July 9, 1946 |
| 2,424,542 | Adams | July 29, 1947 |
| 2,472,527 | Gordon | June 7, 1949 |
| 2,692,417 | Primich | Oct. 26, 1954 |
| 2,700,808 | Wells | Feb. 1, 1955 |
| 2,739,018 | Collett | Mar. 20, 1956 |
| 2,778,085 | Bernard | Jan. 22, 1957 |
| 2,781,212 | Jugle | Feb. 12, 1957 |

FOREIGN PATENTS

| 142,343 | Great Britain | May 6, 1920 |